United States Patent [19]

Ting

[11] Patent Number: 5,350,282
[45] Date of Patent: Sep. 27, 1994

[54] PNEUMATIC TIN SUCKER

[76] Inventor: Chi-Hung Ting, 79, Alley 2, Sheng-Li St. Yung-Kang Shiang, Tainan Shien, Taiwan

[21] Appl. No.: 59,258

[22] Filed: May 10, 1993

[51] Int. Cl.⁵ .................................................. F04B 17/00
[52] U.S. Cl. ................................... 417/402; 417/490
[58] Field of Search ................ 417/402, 490; 91/227

[56] References Cited

U.S. PATENT DOCUMENTS

| 3,199,415 | 8/1965 | Stanton et al. | 417/402 |
| 3,749,527 | 7/1973 | Slagle | 417/402 |
| 3,804,557 | 4/1974 | Bentley | 417/402 |

*Primary Examiner*—Richard E. Gluck
*Assistant Examiner*—Alfred Basichas

[57] ABSTRACT

A pneumatic tin sucker having a sucking nozzle connected with a connecting tube connected with a lower inlet chamber of a control tube, and a compressed air tank deposited in an upper chamber of the control tube, a piston rod deposited to extend in the inlet chamber and the connecting tube, an upper piston in the inlet chamber connected with an upper end of the piston rod and a lower piston in the connecting tube connected with the lower end thereof, the upper and the lower piston being pushed up by compressed air coming from the tank through a stop valve opened by pressing a push button on the wall of the control tube so that open air together with molten tin can be sucked through the nozzle in a tin sucking chamber therein.

2 Claims, 6 Drawing Sheets

PNEUMATIC TIN SUCKER

BACKGROUND OF THE INVENTION

A conventional pneumatic tin sucker as shown in FIG. 1 comprises a housing 1, a piston rod 11 in the housing 1, a push button 12 with a lower bar 13 on top of the rod 11, a release button 14 below the bar 13, a piston 15 connected with the piston rod 11, a release button 14, and a coil spring 16 under the piston 15. After the whole tin sucker is assembled, the push button 12 is pressed to push down the piston 15 to compress the spring 16, and the bar 13 fits with the release button 14. In this condition, a sucking nozzle 17 is moved near molten tin scrap and the release button 14 is pressed down, permitting the spring 16 to recover and push up the piston rod 11 and the piston 15 in the housing 1 so that the tin scrap may be sucked through the nozzle 17 into the housing 1.

However, the conventional tin sucker has several inconveniences. The push button 12 has to be forcefully pressed down with a thumb every time the sucker is used. A thumb will hurt after frequent use. The release button also has to be pressed down, in addition to pressing of the push button to finish the sucking operation. Consequently, molten tin scrap might solidify before being sucked by the sucker.

There is in the prior art a tin sucker combined with a vacuum pump or air compressor for producing a large sucking force. It involves a very high cost and a large number of components, and is not popular for most users.

SUMMARY OF THE INVENTION

This invention has been devised to offer an improved pneumatic tin sucker which has a sucking nozzle connected with a connecting tube. The tube is connected with a lower inlet chamber of a control tube which also includes an upper chamber divided from the lower inlet chamber by a separating wall. A compressed air tank is contained in the upper chamber. A piston rod is placed with a lower end in the hollow interior of the connecting tube and with an upper end in the inlet chamber of the control tube. A piston is provided on each end of the piston rod. The compressed air in the compressed air tank is released through a valve at a bottom end of the tank. The air flows through an air tube through a stop valve selectively opened by a push button, and then into the inlet chamber to swiftly push up the upper piston therein. At the same time, the lower piston in the connecting tube is also pushed up so that open air together with molten tin scrap can be sucked through a nozzle hole into a tine storing chamber in the nozzle communicating with the hollow interior of the connecting tube. Exhaust holes are provided in the wall of the inlet chamber to release the compressed air, thus permitting the upper and lower pistons to fall until they are stopped by two stop edges in an upper wall of the nozzle.

The pneumatic tin sucker of the present invention has the following advantages:
1. It is not necessary to exert a great deal of force in pushing the push button.
2. The tin sucking operation is rapid, initiated only by pressing the push button.
3. It is not necessary to use an additional compressor or a vacuum pump.
4. The device is small for easy carrying and simple handling.

DETAILED DESCRIPTION OF THE INVENTION

Figure 1:
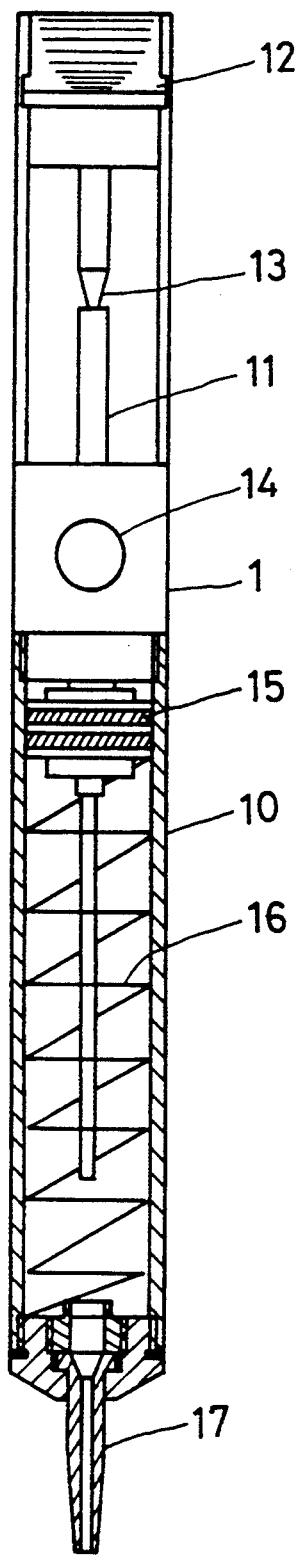
FIG. 1 is a cross-sectional view of a conventional pneumatic tin sucker.
Figure 2:
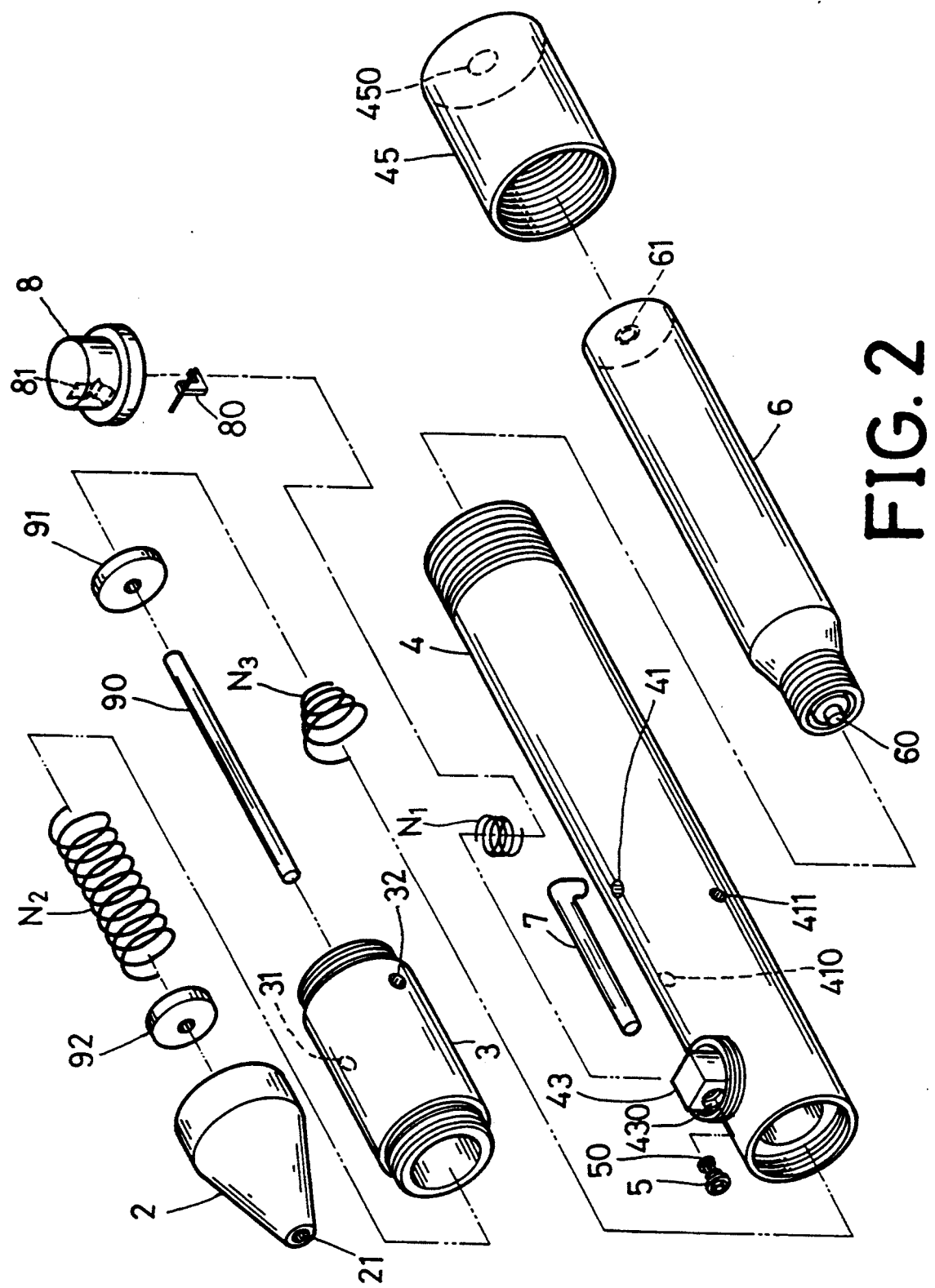
FIG. 2 is an exploded perspective view of a pneumatic tin sucker of the present invention.
Figure 3:
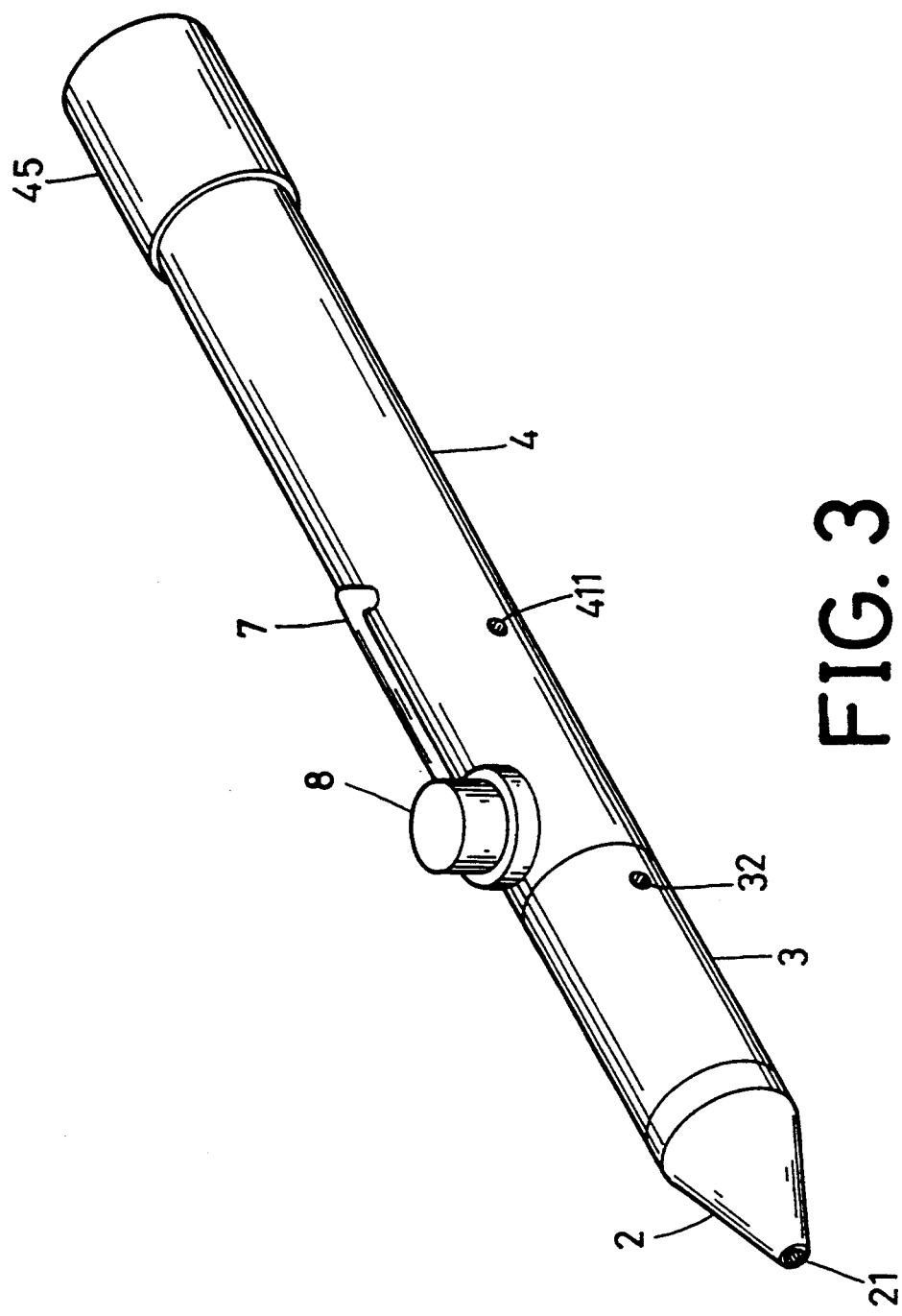
FIG. 3 is a perspective view of the pneumatic tin sucker at the present invention.
Figure 4:
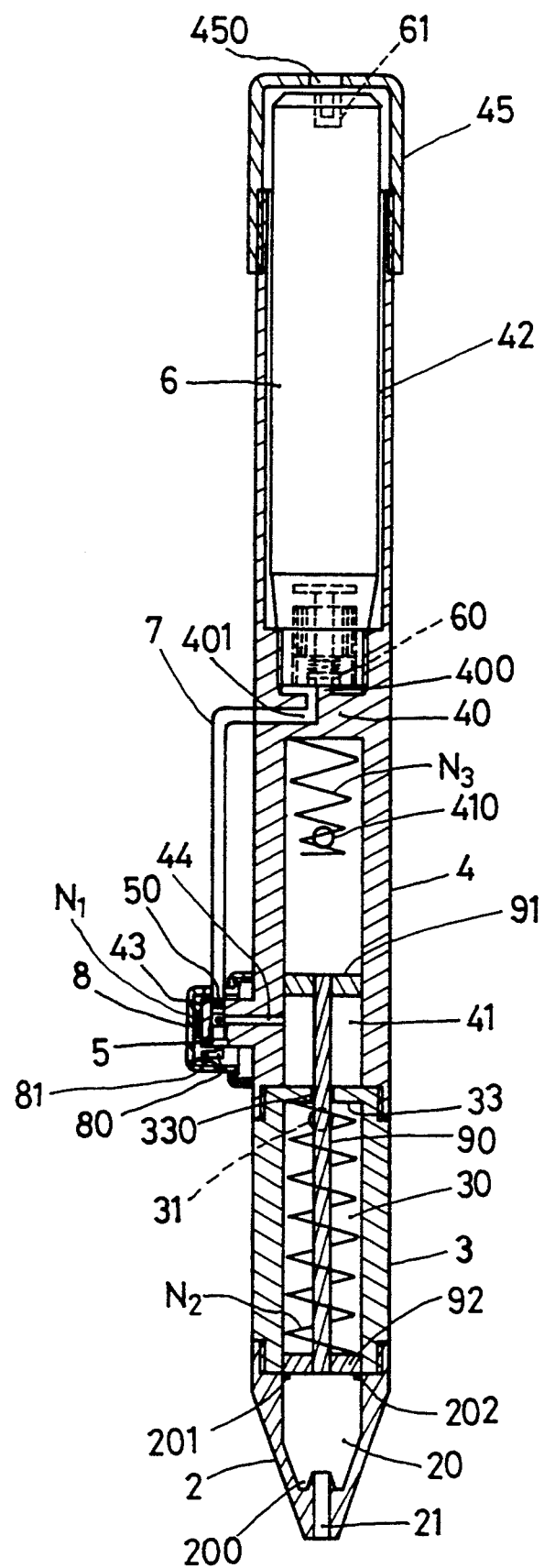
FIG. 4 is a cross-sectional view of the pneumatic sucker of the present invention.

A pneumatic tin sucker as shown in FIGS. 2, 3 and 4 comprises a nozzle 2, a connecting tube 3, a control tube 4, a valve member 5, an air tank 6, an air tube 7, a push button 8, an actuating unit 9 a cap 45 and three springs N1, N2, N3 as components.

The nozzle 2 is shaped as an inverted cone and includes a tin sucking chamber 20 and an air passageway 21 extending from a small outer lower end into the tin sucking chamber 20. An annular tin store recess 200 encircles an upper end of the air passageway 21. Two opposing projecting stop edges 201, 202 are situated on the walls of the tin sucking chamber 20 at an upper end thereof.

The connecting tube 3 has a threaded lower end to screw into an upper end of the nozzle 2. A longitudinal hollow interior 30 of the connecting tube 3 with the tin sucking chamber 20 of the nozzle 2. Two opposing round holes 31, 32 are provided in the connecting tube 3 for exhausting air. An upper end wall 33 of the connecting tube 3 has a central hole 330 therein for a piston rod 90 to pass through.

The control tube 4 has a threaded lower end to screw into an upper end of the connecting tube 3. An inner separating wall 40 in the control tube 4 divides the control tube 4 into chambers: an inlet chamber 41 between the separating wall 40 and an upper end wall 33 of the connecting tube 3, and an upper chamber 42 between the separating wall 40 and a top end of the control tube 4. Two opposing outlet holes 410, 411 in the intermediate portion of the control tube 4 allow the release of compressed air. A projection 43 on an outer wall of a lower end portion of the control tube 4 includes a cell 430 and an inlet hole 44 which communicates with the cell 430 in the projection 43. A projection 400 on an upper central surface of the separating wall 40 triggers the air tank 6. An air passageway 401 conducts air from the air tank 6 to the cell 430 in the projection 43.

The valve member 5 is situated in the cell 430 of the projection 43, and includes a stop valve 50.

The tubular air tank 6 has a lower end which screws into an intermediate portion of the wall of the control tube 4 and is contained in the upper chamber 42. The air tank 6 has an air valve 60 at a lower end and a filling hole 61 in an upper end wall.

The air tube 7 has an upper opening connected with the air passageway 401 in the separating wall 40 of the control tube 4. A lower opening is connected with the cell 430 of the projection 43. The air tube 7 communicates with the inlet hole 44 by means of the valve member 5.

The push button 8 is held in place by a ring which encircles projection 43. Spring N1 urges the push button 8 upward. The button 8 is in communication with an L-shaped hammer head 80 via actuating means 81. The hammer head 80 is in turn in communication with stop valve 50. Thus, when the push button 8 is depressed, stop valve 50 is opened, allowing air to flow from cell 430, through the inlet hole 44, and into inlet chamber 41.

The actuating unit includes a piston rod 90 passing through the hole 330 in the upper end wall 33 of the connecting tube 3, an upper piston 91 connected with an upper end of the piston rod 90 and deposited in the inlet chamber 41 of the control tube 4, and a lower piston 92 connected with a lower end of the piston rod 90 and deposited in the hollow interior 30 of the connecting tube 3.

The tubular cap 45 screws onto the upper end of the control tube 4. The cap 45 has a central inserting hole 450 in an upper end surface to accommodate a Joint to fill the air tank 6 with compressed air.

The coil spring N2 has its lower end urging an upper surface of the lower piston 92, and its upper end urging a lower surface of the upper end wall 33. The helical spring N3 has its upper end fixed on a lower surface of the separating wall 40.

In assembling this pneumatic tin sucker, as shown in FIG. 4, first, the lower piston 92 is connected with piston rod 90. The coil spring N2 is placed on the lower piston 92, and the upper end of the piston rod 90 is made to pass through the hole 330. Next, the nozzle 2 is screwed into the connecting tube 3, and the upper end of helical spring N3 is fixed below the separating wall 40. Then the piston 91 is connected with the top end of the piston rod 90, and the connecting tube 3 is screwed into the control tube 4. After that, the valve member 5 is placed in the cell 430, and the push button 8 is placed in an opening in the outer lower wall of the control tube 4 so as to permit the hammer head 80 to communicate with the top valve 50.

The air tube 7 is assembled between the air passageway 401 and the opening of the cell 430. The tubular air tank 6 is deposited in the upper chamber 42 of the control tube 4 and is screwed into the inner intermediate wall of the control tube 4 so that the projection 400 urges the air valve 60 to allow compressed air in the tank 6 to flow through the air valve 6, through air tube 7, until it is stopped by the valve member 5. Lastly, the cap 45 is screwed onto the outer wall of the control tube 4 to finish assembly of this pneumatic tin sucker.

If compressed air is directly supplied through the central hole 450 of the cap 45 from a separate compressor into the upper chamber 42, the air tank 6 is not required and may be removed.

Figure 5:
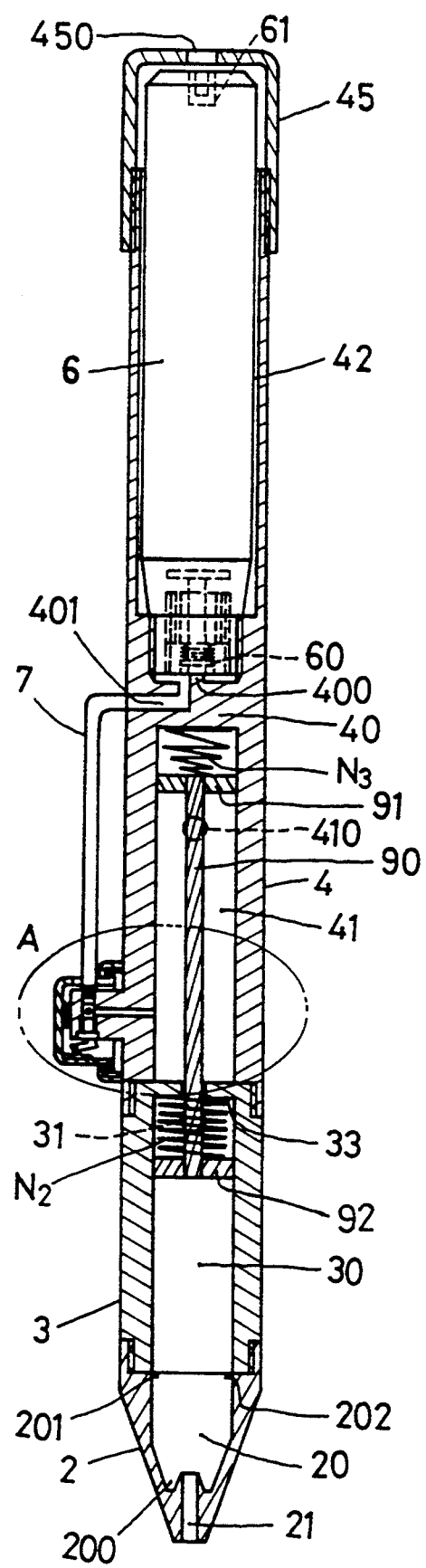
FIG. 5 is a cross-sectional view of the pneumatic tin sucker of the present invention, showing a piston rod in the raised position.
Figure 6:
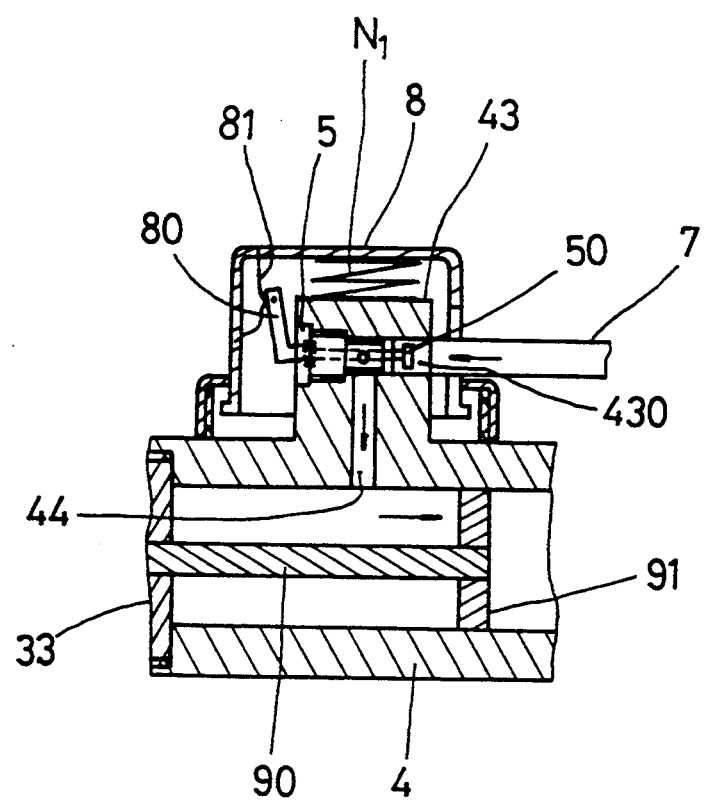
FIG. 6 is a magnified view of the part marked "A" in FIG. 5.

In use as shown in FIGS. 5 and 6, the push button 8 is pressed down to force the hammer head 80 to push and open the stop valve 50. This allows compressed air coming out of the tank 6 to flow through the stop valve 50 into the inlet chamber 41 via the inlet hole 44. When compressed air enters the inlet chamber 41, it swiftly forces the upper piston 91 and the lower piston 92 upward, so long as the compressed air coming in the inlet chamber 41 has a larger pressure than the resistant force of the two pistons 91, 92 and the coil spring N2. The greater the pressure of the compressed air, the faster the two pistons 91, 92 move up. As the lower piston 92 is pushed up quickly, the air outside the passageway 21 of the nozzle 2 can be instantly sucked through the passageway 21 into the sucking chamber 20. A user holds the nozzle 2 near molten tin scrap to suck it into the sucking chamber 20. Then the tin sucked in can fall down into the tin store recess 200 at the button of the tin sucking chamber 20. When the two pistons 91, 92 reach an upper dead point, the two round holes 31, 32 and the outlet holes 410, 411 exhaust the air in the inlet chamber 41 and in the connecting tube 3 so that the upward force of the two pistons 91, 92 diminishes and the two springs N2, N3 push down the two pistons 91, 92. The lower piston 92 is stopped by the two projecting edges 201, 202 in the nozzle 2, returning to its original position.

What is claimed is:

1. A pneumatic tin sucker comprising:

a nozzle with an inverted cone shape, having a hollow interior with a tin sucking chamber and a passageway extending from a small end into the tin sucking chamber:

a connecting tube having a lower end which screws into an upper end of the nozzle, the connecting tube having a hollow interior communicating with the tin sucking chamber of the nozzle, and further including an upper end wall and a hole in the upper end wall for a piston rod to pass through;

a control tube having an lower end which screws into an upper end of the connecting tube, a separating wall in an intermediate portion to divide its hollow interior into an upper chamber and a lower inlet chamber, and a projection on an outer lower surface;

a valve member secured in the projection of the control tube and having a stop valve therein;

an air tank for storing compressed air therein, having an air valve at a lower end and a filling hole in an upper end, and being deposited in said upper chamber of the control tube;

a push button secured by a ring around the projection of the control tube on an outer wall of the control tube, and further having a hammer head therein;

an actuating unit including a piston rod extending in the inlet chamber of the control tube and the interior of the connecting tube, an upper piston in the inlet chamber connected with an upper end of the piston rod, and a lower piston in the connecting tube connected with a lower end of the piston rod;

a cap of a tubular shape having an inserting hole in an upper end, and screwing onto the upper end of the control tube;

a coil spring deposited around the piston rod and between the upper end wall of the connecting tube and the lower piston, and a helical spring fixed on the separating wall of the control tube; wherein said tin sucking chamber has two opposing projecting stop edges at an upper end and a tin storing recess at a lower end, and there is an inlet hole through the lower wall of said control tube, said projection on said control tube having a cell for depositing said valve member therein, said cell communicating with said inlet hole, said separating wall in the control tube having an upper projection and an air passageway connected with an air tube, said air tube being controlled by said valve member and in communicating with said inlet hole, said inlet chamber having several exhausting holes, said air valve of the air tank is urged by the upper projection on said separating wall to allow the compressed air to flow through the air tube, said compressed air being kept in balance with the air passageway and the air tube and checked by the valve member, said push button being pressed to actuate the hammer head and thus the stop valve to permit compresses air to flow through the inlet hole into the inlet chamber, said two pistons being pushed up to cause a strong sucking force in said tin sucking chamber so that tin scrap can be sucked together with air through the passageway into the tin sucking chamber where it is received in said tin storing recess, said two pistons then being pushed down until said lower piston is stopped by said two stop edges by the two springs after said pistons have reached an upper dead point.

2. The pneumatic tin sucker as claimed in claim 1, wherein:

said inserting hole of said cap is used to connect with a joint for introducing compressed air into said upper chamber of said control tube.

* * * * *